United States Patent [19]

Poncin et al.

[11] 4,352,126
[45] Sep. 28, 1982

[54] SYSTEM FOR REDUCING VISIBLE NOISE IN TELEVISION IMAGES

[76] Inventors: Jacques Poncin, 11 boulevard Volney, 35000 Rennes; Pierre Rogel, 14, rue Gould'oeuvre, 35690 Acigne; Maurice Remy, 5 avenue Erlanger, 75016 Paris, all of France

[21] Appl. No.: 177,012

[22] Filed: Aug. 11, 1980

[30] Foreign Application Priority Data

Aug. 16, 1979 [FR] France ............................. 79 21201

[51] Int. Cl.³ .............................................. H04N 5/21
[52] U.S. Cl. .................................................. 358/167
[58] Field of Search ............................ 358/167, 36, 22

[56] References Cited

U.S. PATENT DOCUMENTS 4,242,704 12/1980 Ito et al. ................................ 358/36

FOREIGN PATENT DOCUMENTS 7711800 11/1978 France .

OTHER PUBLICATIONS

Connor et al., "A Frame-to-Frame Picturephone® Coder For Signals Containing Differential Quantizing Noise", *Bell System Technical Journal*, vol, 52, No. 1, Jan. 1973, pp. 35-51.

*Primary Examiner*—John C. Martin
*Attorney, Agent, or Firm*—Laff, Whitesel, Conte & Saret

[57] ABSTRACT

A motion detector system reduces visible noise in television image signals by use of a numerical time filter. A sample memory is coupled to the output of the time filter. In the time filter, the sample of the images to be treated is combined with a corresponding and preceding sample delivered by the sample memory. A decision circuit determines whether the combination signal has a parameter of the time filter. A subtraction circuit has a first input coupled to receive the image sample which is to be treated and a second input coupled to receive the corresponding sample delivered by the sample memory. A low-pass filter has parallel inputs for receiving samples delivered by the subtracting circuit. A sign output is derived from an exclusive OR circuit coupled to a low-pass filter and a band-pass filter. A polarity reversal circuit responds to the two filters under control of the OR circuit for executing a polarity reversal when the values of the inputs of the exclusive OR circuit are different, depending on a threshold-type decision circuit.

8 Claims, 10 Drawing Figures

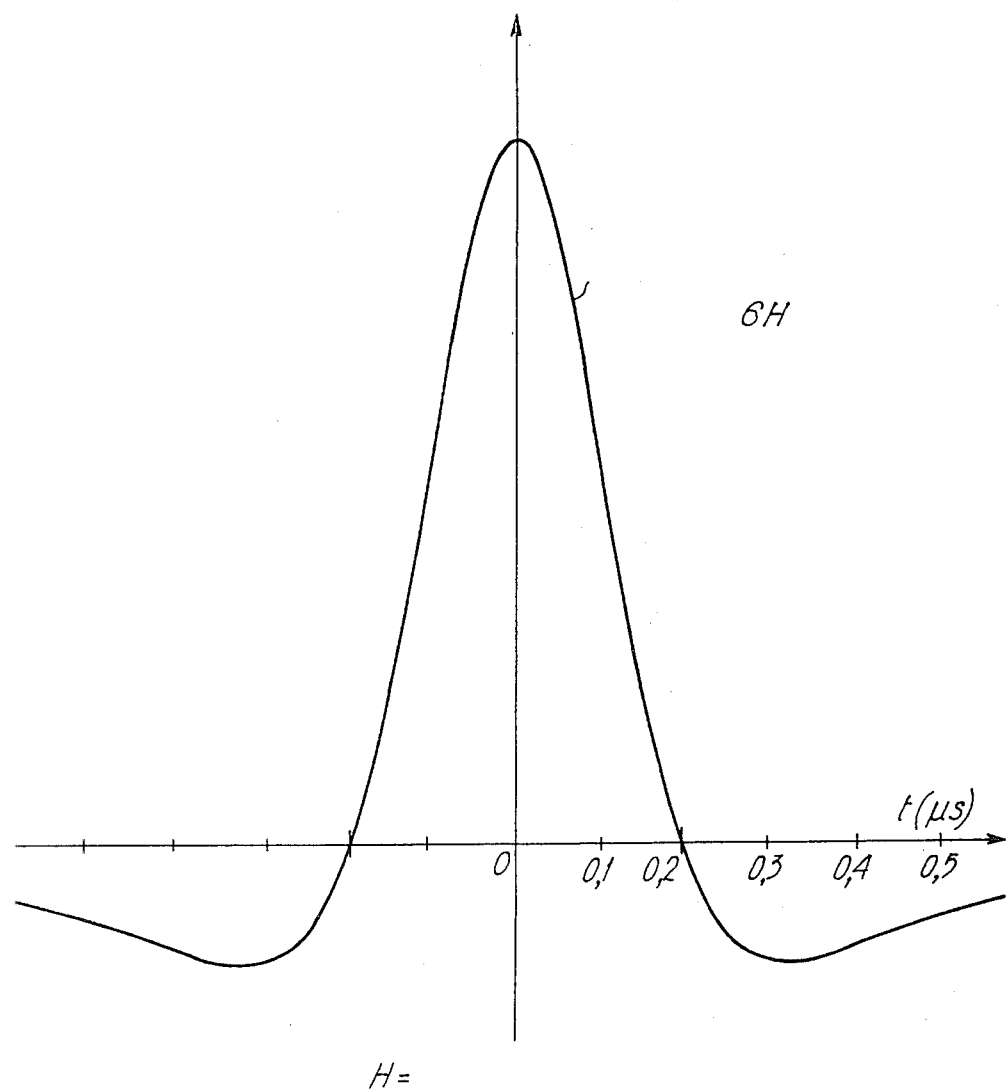

SYSTEM FOR REDUCING VISIBLE NOISE IN TELEVISION IMAGES

The present invention relates to systems for reducing visible noise in television images or pictures by a use of numerical treatment filters.

Presently known systems of a comparable type are described in: French patent application No. 77 11800, filed on Apr. 14, 1977, by the present applicants and published under No. 2 387 557; French patent application published under No. 2 371 108, U.S. Pat. No. 4,090,221; and a technical article by Connor which is found in the Bell System Technical Journal ("B.S.T.J."), Vol. 52, No. 1, of January 1973.

Those prior art systems use an image memory in which a fraction a of each output sample is added to a fraction (1−a) of each corresponding sample of the input signal. The coefficient a is chosen by a decision member which represents a function of the anterior a coefficients and of the output signal of a motion detector. In some systems, the signal applied to the image memory is the input signal; in others, it is the treated signal.

Generally speaking, a motion detector must be capable of distinguishing between the points within a TV picture which are in motion and the stationary points which are not in motion. This distinction must be accomplished in the presence of visible video noise. To that end, the invention uses the space and time correlations of the image signal.

One of the difficulties which is encountered with this prior art type of detector is the detection of fine details which appear as small amplitude variations in the image signal, but the eye is sensitive to these details. For example, it is possible to indicate the hair of a person, the blades of lawn grass, or another and similar highly-detailed background, etc. A motion detector finds errors in those particular cases by a use of a time filtering; therefore, there is a loss of local space definition which includes those fine details.

Generally, an object of the present invention is to provide for a motion detector having improved performances.

Another object of the present invention is to provide a detector which compensates for a loss of fine detail and which also ensures a greater independence of a complete noise reduction system, relative to the noise signal-to-nose ratio of the input image which is to be treated.

In keeping with an aspect of the invention, while improving the detection of fine details, without losing the benefit of the time treatment, it is desirable for the motion detector to have a sensitivity function which is comparable to the sensitivity of the observer's eye. Indeed, it is useless to perfectly detect details which are of very little importance to the human eye. However, if the eye will not tolerate any defect, especially defects involving a loss of definition, it is desirable to ensure a good detection of those details.

Thus, the basic data for an execution of a good quality motion detector are the psychophysical properties of the human vision and, especially, those of visual acuteness. It is difficult to make a space-time filter which acts as the human eye acts. That is why various visual sensitivity curves encountered in technical literature are different, depending on the hypotheses, the criteria and the methodology used by their authors. Nevertheless, they present common fundamental characteristics and, especially, a maximum for mean space frequencies.

The characteristics of the invention will appear more clearly upon reading of the following description of a preferred embodiment, which is given relative to the attached drawings, among which:

FIG. 2 is a diagram which represents the impulse response of a filter, the frequency response of which would correspond to the curves in FIG. 1;

Figure 1:
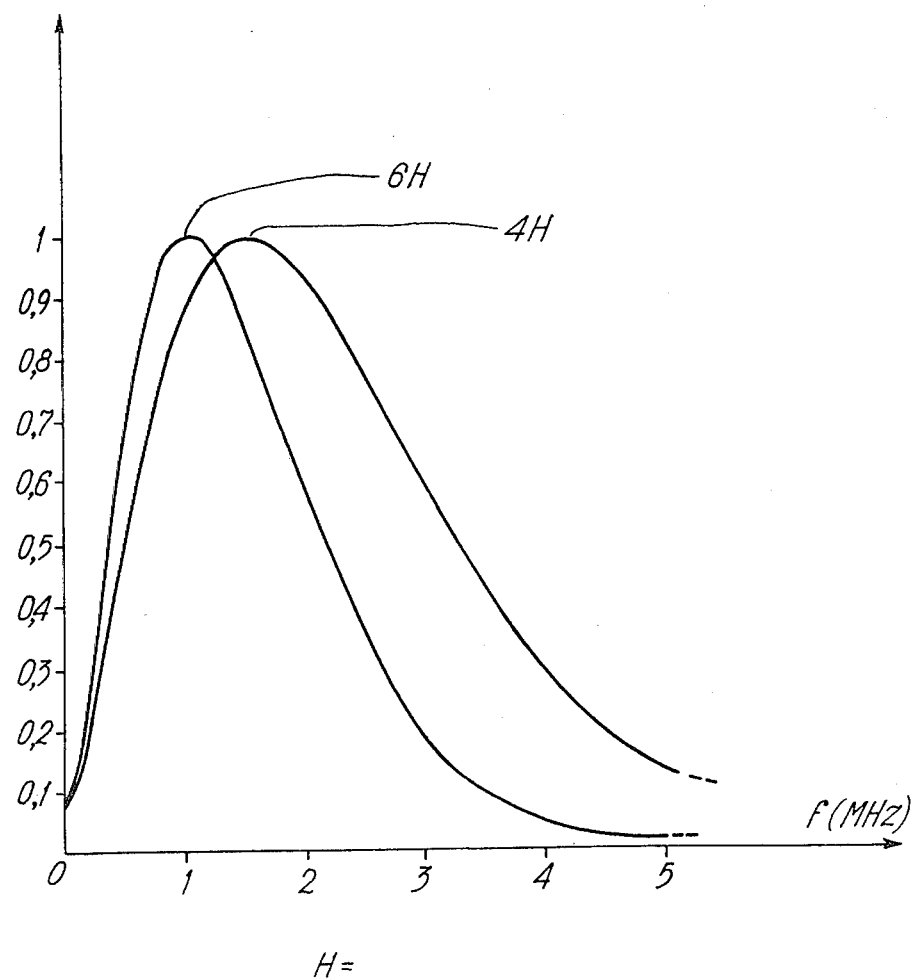
FIG. 1 shows curves which illustrate the relative sensitivity of the eye as a function of space frequencies.

The curves in FIG. 1 express the relative sensitivity of the eye, as a function of space frequencies. Two observation distances were generally chosen from subjective tests. That is to say, observation was over the distances 6H and 4H, where H is the height of the screen. Those curves (FIG. 1) are the result of model making which is described in the technical article "Predictions of an Inhomogeneous Model: Detection of Local and Extended Spatial Stimuli" by F. Kretz, F. Scarabin and E. Bourguignat, sent to be published in 1979 by the "Journal of the Optical Society of America." From an examination of those curves, it appears that the sensitivity of the eye is maximum for a frequency which depends on the observation distance between the viewer and the viewed screen. Moreover, the curve is modified as a function of the time frequencies. The maximum sensitivity always exists for small motions, which is highly important, considering the object of the present invention. Sensitivity tends to disappear as time frequencies increase, which correspond to important motions. In this latter case, the eye acts as a low-pass filter.

FIG. 2 represents the impulse response of the filter for the frequency response given in FIG. 1. From a study of curves 1 and 2, it appears that the eye presents a sensitivity which has the form of a linear space filtering with a maximum of acuity for mean (middle) frequencies. That important property will be used in the motion detector according to the present invention.

It would be possible to make a filter which is equivalent to that represented in FIG. 1. However, the negative lobes of the impulse response in FIG. 2 cause inherent defects in the motion detection. Indeed, the passage of the impulse response through zero introduces a false detection at the point related to it, during a transition of the image. That defect prevents a direct use of such a filter.

Figure 3A:
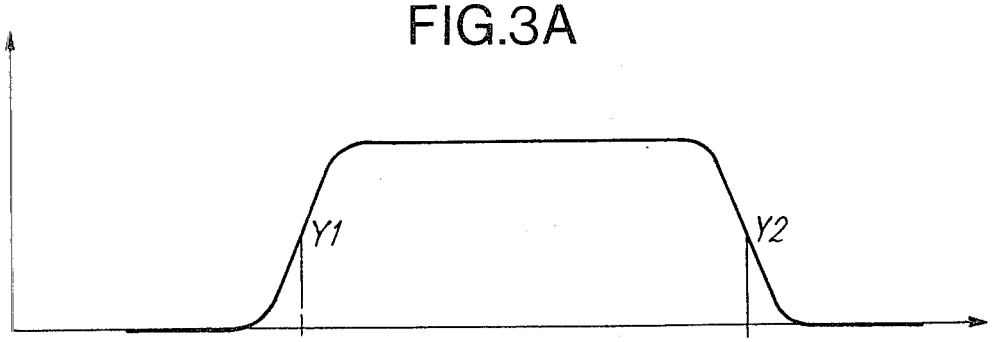
FIGS. 3A and 3B are diagrams of different inter-image amplitudes, as a function of time, which correspond to a time transition created by a vertical contour in horizontal displacement, one prior to filtering, the other after filtering in a filter having an impulse response which corresponds to the curve shown in FIG. 2.

A vertical contour in horizontal displacement creates a time transition which corresponds to a difference of the inter-image amplitude which may be represented by the curve in FIG. 3A. The transitions of the inter-image difference signal, indicated in Y1 and Y2, limit the zone in motion.

Figure 3B:
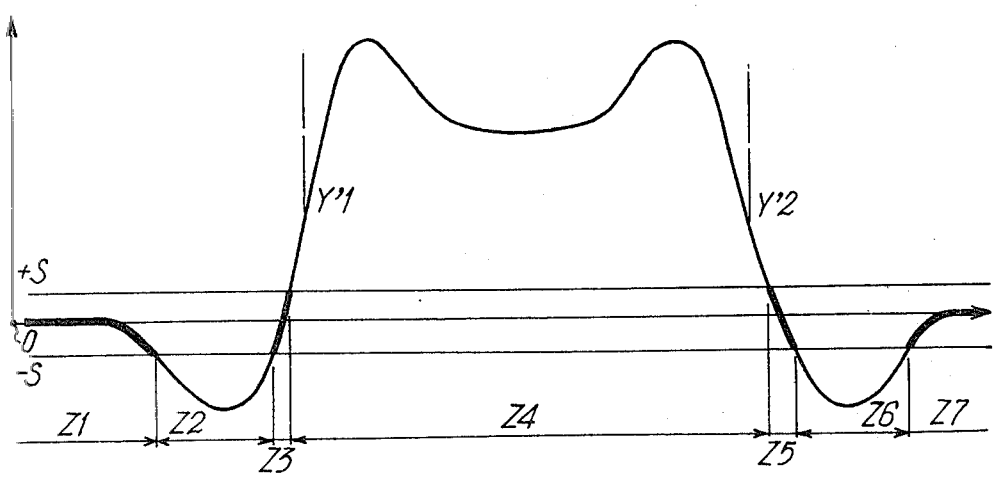

The curve in FIG. 3B represents the signal in FIG. 2 after passage in a filter, the response of which is equivalent to that represented in FIG. 1. Indeed, considering the impulse response in FIG. 2, that filtering brings about the appearance of several zones Z1 to Z7 for curve 3B. Before point Y'1, which corresponds to Y1 to FIG. 3A, there is a zone Z1 of zero amplitude, which then decreases until it crosses the limit $-S$. Then, there is zone Z2 which is located entirely below the limit $-S$. In a zone Z3, the filtered signal increases from limit $-S$ to limit $+S$. At the center, there is a zone Z4 in which the signal is always above the limit $+S$, with two peaks at its opposite ends. To the right of Y2, the zones Z5, Z6 and Z7 are, in the particular case which is given as an illustration, approximately symmetrical with zones Z3, Z2 and Z1.

In order to perform the detection of motion, the deciding circuits of the motion detector are going to compare that filtered signal in FIG. 3B with two symmetrical thresholds which are here assumed to be equal to $+S$ and $-S$. This corresponds to the simplest case. Thus, zones Z1, Z3, Z5 and Z7 are considered as being stationary. The decision is correct for zones Z1 and Z7, but zones Z3 and Z5 cause an erroneous detection because they are located at the transitions of the motion zones. They would cause an inopportune filtering for the points related to them.

According to the characteristics of the present invention, a motion detector comprises a low-pass filter and a band-pass filter. The inputs of these filters receive, in parallel, the samples which are delivered by a subtracting device. The output of the band-pass filter is connected to the input of a polarity inversion circuit which can be governed. The outut of this inversion circuit is connected to the input of an adding device. The output of the low-pass filter is connected to the other input of the adding device. In addition, the sign outputs of the band-pass and low-pass filters are respectively connected to the two inputs of an exclusive OR circuit, the output of which is connected to the governing or control input of the polarity inversion circuit. The polarity inversion is carried out in the polarity inversion circuit which can be governed when the values of the exclusive OR circuit inputs are different. The output of the adding device are connected to a threshold type decision circuit.

Figure 4:
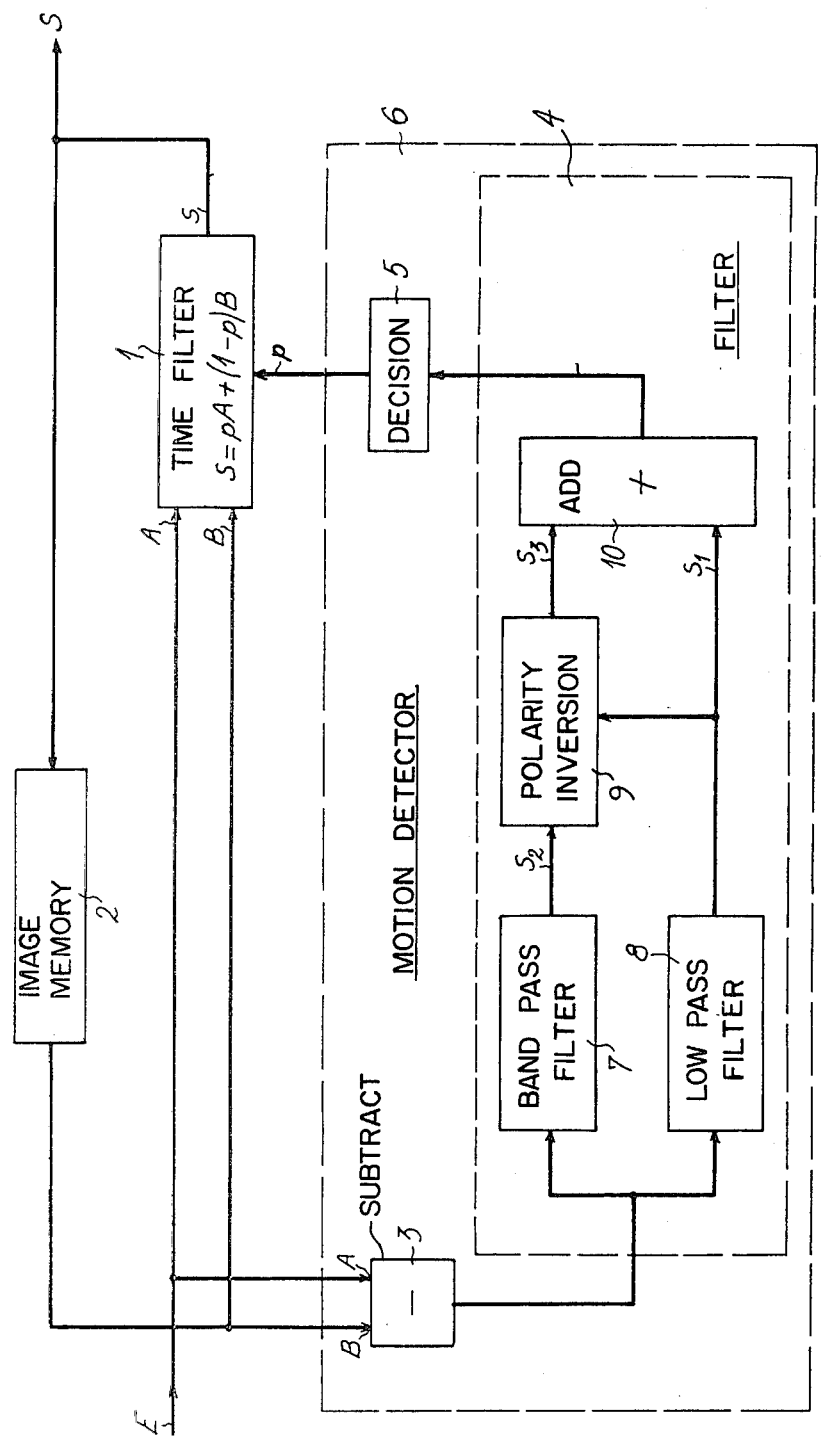
FIG. 4 is a block diagram of a visible noise reduction system, according to the present invention.

The system in FIG. 4 comprises a time filter 1 having one input A connected to input E of the system, which receives the sampled video signals that are to be treated. The output of the time filter 1 is connected, on one side to the system output S. On the other side, the output of filter 1 is connected to the input of an image memory 2, the output of which is connected to the input B of the time filter 1. The system input E and the output of image memory 2 are also respectively connected to the inputs A and B of a subtracting device 3. The output of memory 2 is connected to the input of a filtering circuit 4. The output of circuit 4 is connected to a decision member 5, the output of which is connected to the governing input P of time filter 1. The complex represented by circuits 3 to 5 forms a motion detector 6.

In the system represented in FIG. 4, the time filter combines the signals applied to its inputs A and B according to the following formula:

$$S = pA + (1-p)B \quad (1)$$

in which A represents the amplitude of the current sample applied to input A, that is to say, the direct signal; B represents the amplitude of the treated sample which corresponds to the preceding image, applied to its input B; and p is a coefficient ranging between 0 and 1, which is delivered by the motion detector 6. As an indication, when $p=1$, S is equal to A, which corresponds to the case in which there is important motion. However, when $p=0$, S is equal to B, which corresponds to the case of a motionless image. Between those two limited values, p can assume continuous or discrete values, depending on the nature of the motion detector.

In the motion detector, subtracting device 3 subtracts each sample from the direct signal of its homologue coming from memory 2. That is to say, for each sample, it establishes an inter-image amplitude difference. Therefore, when we have a vertical contour in the horizontal displacement for the samples of one line, the subtracting device 3 delivers signal amplitudes having time variations with the appearance of the curve in FIG. 3A. The object of filter 4 is to modify, according to the present invention, those amplitude variations, in order to deliver a filtered signal to the decision circuit 5. Circuit 5 may be a two-threshold circuit, such as $+S$ and $-S$ indicated above.

With a two-threshold decision circuit, a first decision signal is obtained which is binary. It is either equal to 1 when the applied difference is outside the zone defined between the thresholds, or equal to 0 when inside or between the two thresholds. That first decision element may be combined with the preceding decision elements in the decision circuit, in order to define the parameter p which is applied to the time filter 1. One example of a combination of decision elements is given in the "truth" table of the description of French patent publication No. 2 387 557.

According to the invention, filtering circuit 4 comprises a band-pass filter 7 and a low-pass filter 8, the inputs which are connected in parallel to the output of a subtracting device 3. The output of the band-pass filter 7 is connected to the signal input of a polarity inversion circuit 9, the signal output of which is applied to an input of an adding device 10. The output terminal of the low-pass filter 8 is connected on one side to the governing input of polarity inversion circuit 9 and on the other side to the second input of the adding device 10. The output of the adding device 10 is connected to the input of the decision circuit 5.

In the filter 4 (FIG. 4), the low-pass filter 8 removes the "crest" of the amplitude differences resulting from noise peaks, but it detects motion. The band-pass filter 7 is centered on a value close to that of maximum visual acuity, and it detects the fine details. However, it is known that the signal resulting from the sum of the outputs of filters 7 and 8 corresponds to a response curve of the type represented in FIG. 3B. A situation such as this would bring about decision errors for the negative zones Z2 and Z6, as explained above.

Figure 5A:
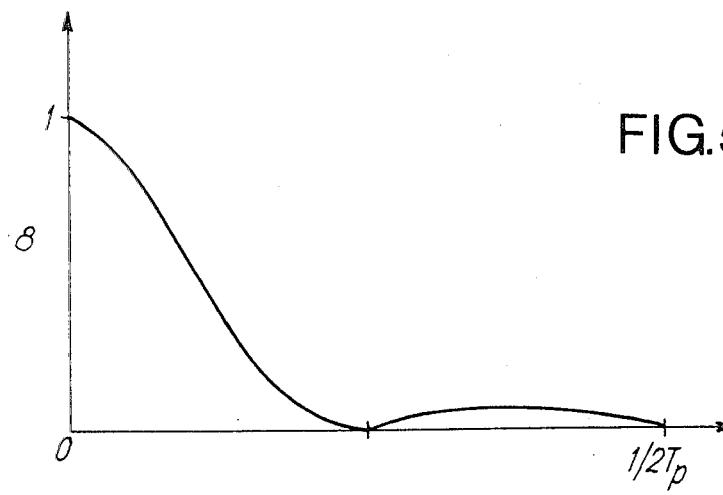
FIGS. 5A to 5C are amplitude frequency diagrams which make it possible to illustrate the functioning of the system in FIG. 4.
Figure 5B:
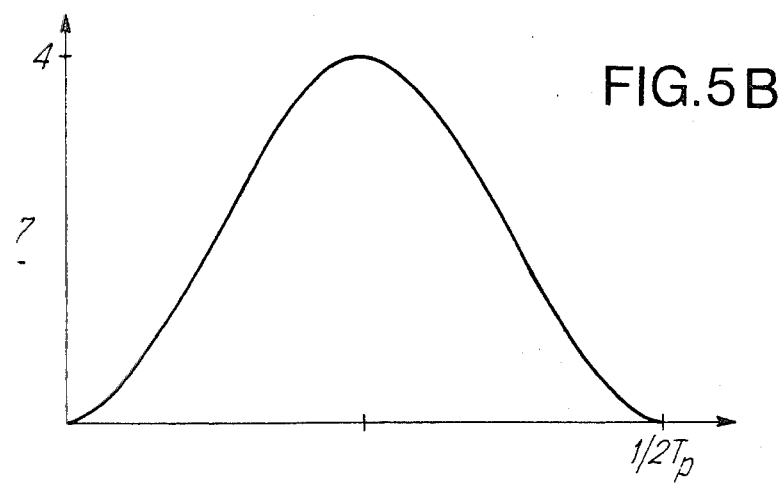
Figure 5C:
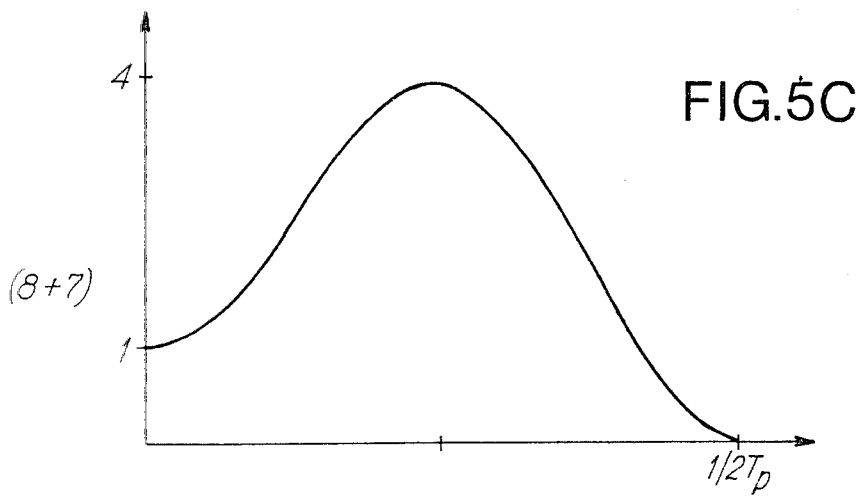

FIG. 5A represents the response of a low-pass filter, such as 8, corresponding to formula (3), below. FIG. 5B represents the response of a band-pass filter, such as 7, corresponding to formula (2) below. FIG. 5C represents the sum of the responses which gives a curve that is close to those curves which are shown in FIG. 1.

The polarity inversion circuit 9 delivers an output signal having an amplitude which is that of the signal which it receives from filter 7, affected by a sign which is the product of the signs of the signal applied by filters 7 and 8. The following table indicates the operation of the polarity inversion circuit:

| S1 | S2 | S3 |
|---|---|---|
| positive | positive | S2 |
| positive | negative | −S2 |
| negative | positive | −S2 |
| negative | negative | S2 | in which S1 and S2 respectively represent the output signals of filters 7 and 8.

Signal S1 and the output signal of the inversion circuit 9, which corresponds to the signal of the third column of the above table, are then added to the adding circuit 10. The curve of the output signal of the adding device 10 is a function of the time, which then has the appearance of the curve in FIG. 6.

Figure 6:
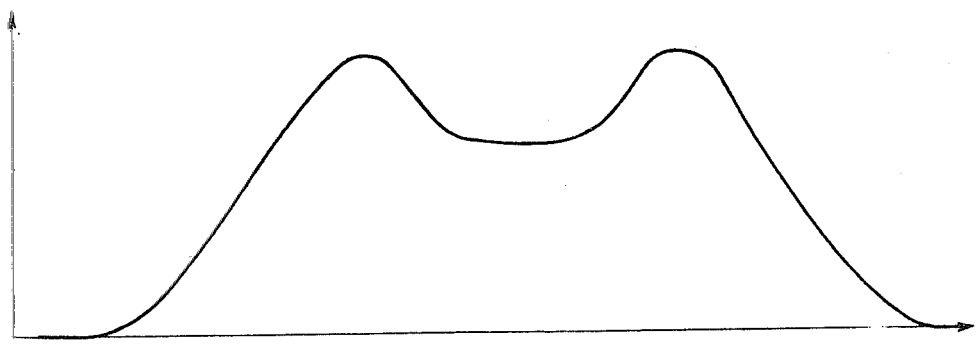
FIG. 6 is a diagram which illustrates the inter-image amplitude difference obtained at the output of the filtering circuit of the system in FIG. 4, when an input signal represented in FIG. 3A is applied to it.

It will be observed that, in the curve in FIG. 6, the negative zones Z2 and Z6 no longer exist. Indeed, for zone Z2, in FIG. 3B, the output signal of the low-pass filter 8 is positive. Thus, circuit 9 delivers the signal −S2 which is positive and which, when added to the positive signal S1 in adder 10, gives a positive adder output signal. Thus, any possibility of decision error is eliminated at the output of the filtering circuit.

Figure 7:
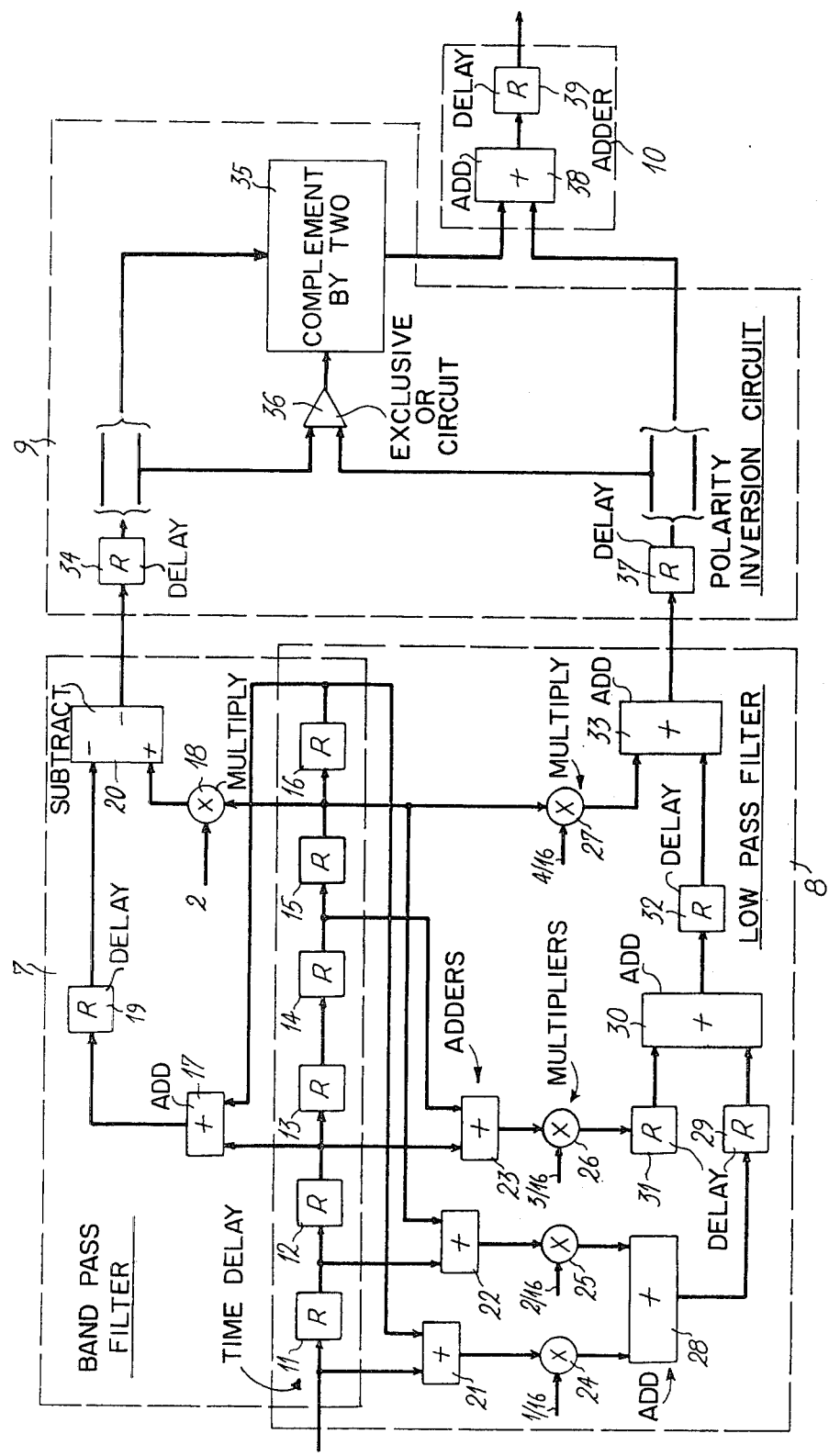
FIG. 7 is a detailed diagram of the filtering circuit used in the system in FIG. 4.

The detailed diagram in FIG. 7 indicates how the filters 7 and 8 and the polarity inversion circuit 9 may be constructed. Filters 7 and 8 have, in common, a chain of time delay circuits 11 to 16, connected in series. Each time delay circuit brings a time lag, which is equal to one sampling period T. The input of time delay circuit 11 is connected to the output of the subtracting device 3 (FIG. 4), which delivers the inter-image amplitude differences.

In filter 7, the outputs of the time delay circuits 12 and 16 respectively are connected to two inputs of an adding device 17. The output of the time delay circuit 15 is connected to the input of a multiplier 18, the multiplication coefficient of which is equal to "2." The output of adding device 17 is connected to the input of a subtracting device 20. The output of multiplier 18 is connected to the + input of subtractor 20. Circuit 19 also brings about a time lag equal to one sampling period T.

It can be shown that signal $S_2(t)$, which is delivered to the output of subtracting device 20, corresponds to the following formula:

$$S_2(t) = -E(t-2T) + 2E(t) - E(t+2T) \qquad (2)$$

Indeed, during one sampling period, circuit 19 memorizes the result of the addition of outputs of delay circuits 12 and 16, while circuit 15 memorizes the output of delay circuit 14, at the point in time when the outputs of delay circuits 12 and 16 are added to adder 17.

In low-pass filter 8, the input of delay circuit 11 and the output of delay circuit 16 are respectively connected to the inputs of an adding device 21. The outputs of delay circuits 11 and 15 are respectively connected to the inputs of an adding device 22. The outputs of delay circuits 12 and 14 are respectively connected to the inputs of an adding device 23. The output of adding device 21 is connected to the input of a multiplier 24, the multiplication coefficient of which is equal to 1/16.

The output of the adding device 22 is connected to the input of a multiplier 25, the multiplication coefficient of which is equal to 2/16. The output of adding device 23 is connected to the input of a multiplier 26, the multiplication coefficient of which is equal to 3/16. The output of delay circuit 15 also is connected to the input of a multiplier 27, the multiplication coefficient of which is equal to 4/16. The outputs of multipliers 24 and 25 are respectively connected to the inputs of an adding device 28, the output of which is connected, through a time delay circuit 29, to an input of an adding device 30. The output of multiplier 26 is connected, through a time delay circuit 31, to the other input of an adding device 30. Output of adder 30 is connected, through a time delay circuit 32, to an input of an adding device 33, the other input of which is connected to the output of a multiplier 27. Delay circuits 29, 31 and 32 each bring about a time lag equal to one sampling period T.

It is possible to show that signal $S_1(t)$ which is delivered from the output of adding device 33, corresponds to the following formula:

$$S_1(t) = \frac{1}{16} E(t-3T) + \qquad (3)$$
$$\frac{2}{16} E(t-2T) + \frac{3}{16} E(t-T) + \frac{4}{16} E(t) +$$
$$\frac{3}{16} E(t+T) + \frac{2}{16} E(t+2T) + \frac{1}{16} E(t+3T)$$

In FIG. 5A, the amplitude-frequency diagram corresponds to the above formula 3 of signal $S_1(t)$ in the output from adding device 33, that is to say, the output of the low-pass filter 8. The appearance of the curve in FIG. 5A is well-known in the field of numerical filters.

In the same manner, FIG. 5B shows the amplitude-frequency diagram which corresponds to formula (2) above which is the output signal $S_2(t)$ of the subtracting device 20, that is to say, the output of band-pass filter 7. The appearance of the curve in FIG. 5B also is well-known in the field of numerical filters.

FIG. 5C shows the sum of the curves in FIGS. 5A and 5B which effectively correspond to the appearance of the curves in FIG. 1. Normally, the sampling frequency of a television signal is in the order of 8 to 9 MHz, this corresponding to one sampling period T, which is found between 110 and 124 ns. It really appears that the frequency which corresponds to the maximum of the curve in FIG. 5C is close to 2 MHz, that is to say, of the frequencies of the maxima of the curves in FIG. 1.

It must further be noted that the time delay circuits 19, 29, 31 and 32 (FIG. 7) are provided to take into account the calculation times required in the addition or multiplication circuits which precede them. Of course, the readings of those delay circuits are synchronzied by a conventional clock (not shown).

The polarity reversal circuit 9 comprises a time delay circuit 34, the input of which is connected to the output of a subtractor 20 and the output of which is connected to the input of a complementing circuit 35. The sign output terminal of circuit 34 is connected to an input of an exclusive OR circuit 36, the output of which is connected to the governing or control input of circuit 35. The polarity reversal circuit 9 comprises a time delay circuit 37, the input of which is connected to the output of adding device 33. The sign output terminal of circuit 37 is connected to the second input of the exclusive OR circuit 36. Circuit 35 is a circuit of the "complementing by two" type which can be governed or controlled, depending on the signal which is applied to its governing input. Circuit 35 passes the signal applied to it by delay circuit 34, without changing its sign, and then transmits the "complementing by two" of that signal. As indicated in the above table, when the values applied to the two inputs of circuit 36 have the same sign, the output signal of circuit 36 is such that complement circuit 35 does not proceed to complementation. However, if those values are of opposite signs, it causes the "complementing by two." The output of complementer circuit 35 is connected to an input of adding device 38. The output of adding device 38 is connected to the input of a time delay circuit 39, with which it forms the adder circuit 10. It is, of course, understood that time delay circuits 34, 38 and 39 provide for the calculation time in the circuits preceding them.

Those who are skilled in the art will readily perceive how to modify the system. Therefore, the appended claims are to be construed to cover all equivalent structures which fall within the true scope and spirit of the invention.

We claim:

1. A motion detector system for reducing visible noise in television images responsive to a numerical treatment of a video signal, said system comprising numerical time filter means, sample memory means coupled to the output of the time filter means, means in said time filter for combining a sample of video image signals to be treated with a corresponding sample signal delivered by the memory means, threshold-type decision circuit means for determining the combination parameter of the time filter, a subtraction circuit means having one input coupled to receive the image sample to be treated and a second input coupled to receive the corresponding sample delivered by the sample memory means, low-pass filter means and band-pass filter means having parallel inputs for receiving samples delivered by said subtracting means, and means for giving sign outputs in response to said band-pass and low-pass filter means, polarity reversal circuit means including an exclusive OR circuit means, said sign outputs being coupled to two inputs of said exclusive OR circuit means, said polarity reversal circuit means being responsive to said two filter means and controlled by said OR circuit means, adding means jointly responsive to the low-pass filter means and said polarity reversal circuit means, the output of said adding means being connected to said threshold-type decision circuit means, and said polarity reversal means executing a polarity reversal when the values of the inputs of the exclusive OR circuit are different.

2. The system of claim 1 wherein said band-pass filter means is centered on approximately the space frequency which corresponds to the maximum acuity of the human eye.

3. The system of claim 1 or claim 2 wherein said low-pass filter means is a numerical filter having an output signal $S_1(t)$, which is a function of the input signal $E(t)$, as given by the following formula:

$$S_1(t) = \frac{1}{16} E(t - 3T) + \frac{2}{16} E(t - 2T) + \frac{3}{16} E(t - T) + \frac{4}{16} E(t) + \frac{3}{16} E(t + T) + \frac{2}{16} E(t + 2T) + \frac{1}{16} E(t + 3T)$$

4. The system of claim 1 wherein the low-pass filter means is a numerical filter having an output signal $S_2(t)$ which is a function of the input signal $E(t)$, given by the following formula:

$$S_2(t) = -E(t-2T) + 2E(t) - E(t+2T).$$

5. The system of claim 2 wherein the low-pass filter means is a numerical filter having an output signal $S_2(t)$ which is a function of the input signal $E(t)$, given by the following formula:

$$S_2(t) = -E(t-2T) + 2E(t) - E(t+2T).$$

6. The system of claim 4 wherein the low-pass filter means is a numerical filter having an output signal $S_2(t)$ which is a function of the input signal $E(t)$, given by the following formula:

$$S_2(t) = -E(t-2T) + 2E(t) - E(t+2T).$$

7. The system according to claim 2 and time filter means for delivering a signal which results from an addition of a video signal sample multiplied by p and of a corresponding preceding sample multiplied by (1−p), the coefficient p being determined by the decision circuit means, the output of which depends on the succession of signals delivered by said adding means.

8. The system according to claim 3 and time filter means for delivering a signal which results from an addition of a video signal sample multiplied by p and of a corresponding preceding sample multiplied by (1−p), the coefficient p being determined by the decision circuit means, the output of which depends on the succession of signals delivered by said adding means.

* * * * *